UNITED STATES PATENT OFFICE.

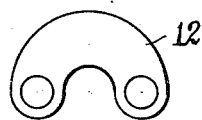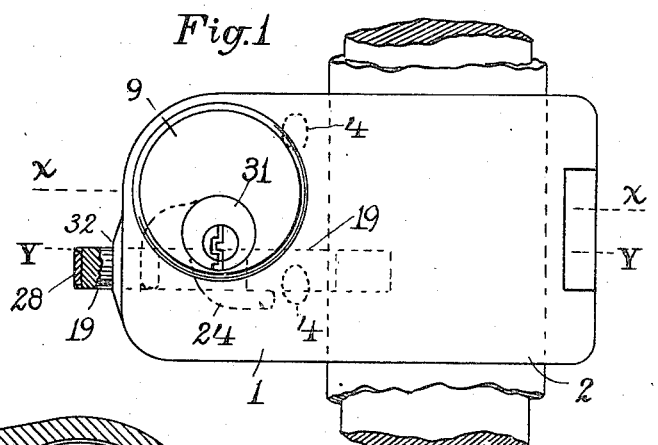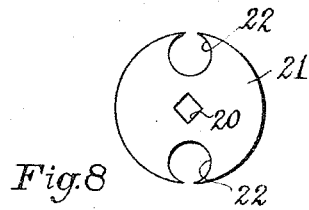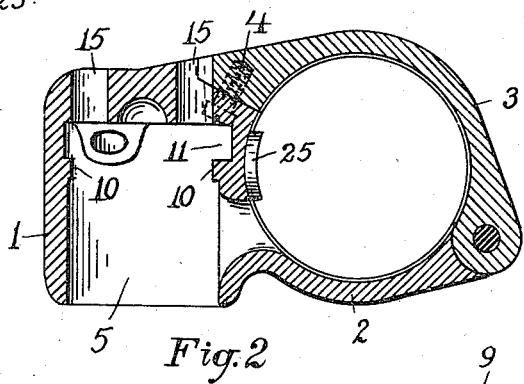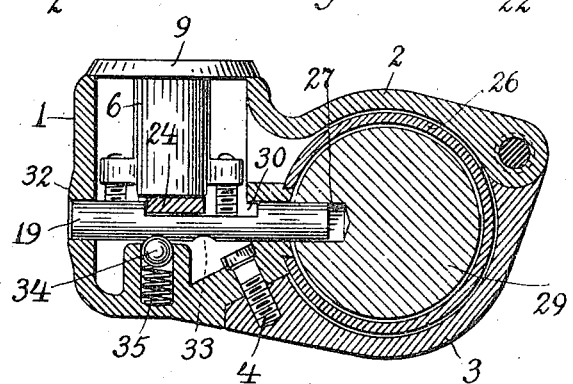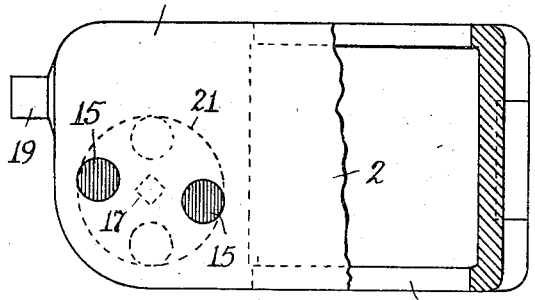

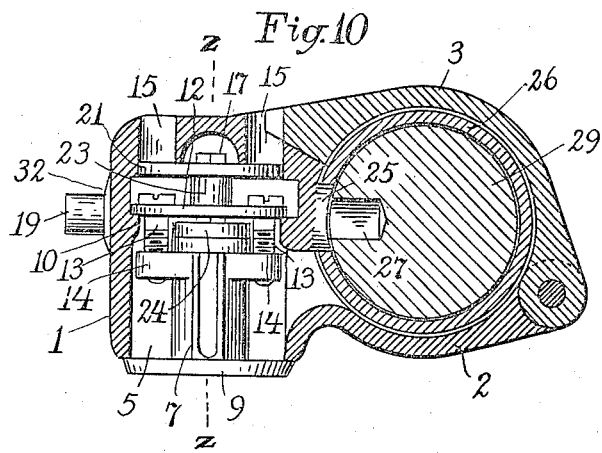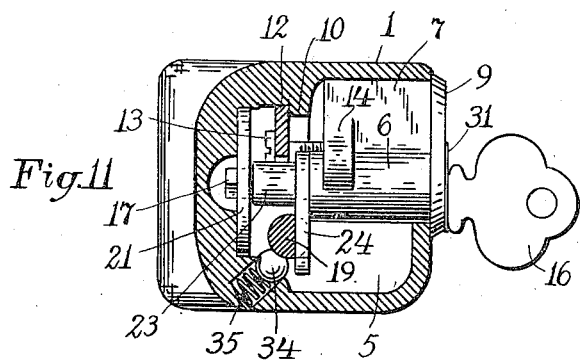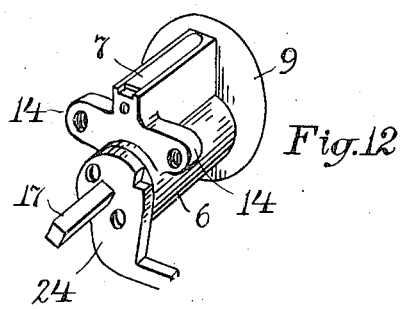

FRANK W. MAILLOUX, OF WELLESLEY HILLS, MASSACHUSETTS.

AUTO-LOCK.

1,268,137.　　　　　Specification of Letters Patent.　　Patented June 4, 1918.

Application filed June 2, 1917. Serial No. 172,531.

*To all whom it may concern:*

Be it known that I, FRANK W. MAILLOUX, a citizen of the United States, and a resident of Wellesley Hills, in the county of Norfolk and Commonwealth of Massachusetts, have invented certain new and useful Improvements in Auto-Locks, of which the following is a full, clear, and exact specification.

The purpose of this invention is the construction of a comparatively inexpensive but reliable device which may be easily attached to the steering post of an automobile, truck or the like, whereby the steering wheel can be instantly locked and kept from being turned until a key has released it, and the automobile thereby made incapable of being stolen; and which device may also be used for other purposes.

Referring to the drawings forming part of this specification, Figure 1 is a side view of the lock shown applied to a steering post. Fig. 2 is a horizontal section on the dotted line X—X in Fig. 1, operative parts being omitted. Fig. 3 is a horizontal section on the line Y—Y in Fig. 1. Fig. 4 is a rear elevation of the lock, with a part thereof broken away. Fig. 5 is a face view of the locking crescent. Fig. 6 is a side view of a sleeve used in the lock. Fig. 7 is an end view of the same. Fig. 8 is a face view of the screw-concealing disk. Fig. 9 is a face view of the bolt-operating cam. Fig. 10 is a horizontal section of the lock on the line X—X in Fig. 1, showing the operative parts in place. Fig. 11 is a sectional elevation on the line Z—Z in Fig. 10. Fig. 12 is a perspective view of the key-receiving member of the lock, showing its bolt-actuating cam.

The lock case comprises a body portion 1 for receiving the locking means, an arm 2 rigid therewith, and a clamping arm 3 hinged to the arm 2 and adapted to be fastened at its free end to the body 1 by screws 4 introduced from within the body-recess 5.

The locking means which is located in the recess or cavity 5, comprises the key-receiving cylinder 6, and the ward-carrying portion 7, a plate 9 being provided for closing the mouth of the cavity. For fastening the locking means within the cavity, the latter is formed with a shoulder 10, as shown in Figs. 2 and 11, behind which a crescent shaped member 12 is confined and attached to the locking means by two screws 13 tapped into ears 14 projecting from the cylinder 6. These screws are enabled to be operated by means of holes 15 in the body in alinement with the screws, through which a screw-driver is inserted for the purpose.

To put the crescent 12 in place, the space behind the shoulder 10 is enlarged radially at one point 11, whereby an end of the crescent can be thrust first into the space 11 and then wholly within the space behind the shoulder, being after that slid to the opposite side, as indicated in Fig. 10.

From the inner end of the cylinder 6 and turned by its key 16 is a square spindle 17. This spindle enters a square hole 20 in a washer 21 which turns in front of and closes the holes 15. As shown in Fig. 8, this washer is formed with two holes 22 positioned and proportioned to be in line with the two holes 15 when the washer is turned to a certain angle, but when the washer is turned at an angle of nearly ninety degrees with relation to said angle, the unperforated portions of the washer stand in front of and entirely close the holes 15, and thereby prevent any introduction of a tool for unfastening the screws 13.

This disk 21 is so disposed that when the locking member 31 within the cylinder 6 is turned by the key and the bolt 19 released from its engagement with the shaft 29, the holes 22 are brought into alinement with the holes 15 and the screws 13 can be reached and manipulated by a screw driver introduced through said holes. I prefer not to lock the bolt by the key, as hereinafter set forth, although immediately after the key has been turned to release the bolt, the key should be turned back to its former position, thus rotating the disk 21 to present its unbroken portions to the holes 15 and shutting off such manipulation. A short section of tubing 23 is mounted on the spindle 17 between the disk 21 and the cam 24 for the purpose of holding the disk in place, as shown in Fig. 11.

The body 1 is formed with a boss 25 concentric with the bolt 19 for entering a hole in the steering post or case 26 in order to insure its position thereon.

The bolt 19 is preferably a section of hard bronze rod slidable in the body 1 for engaging a hole 27 drilled in the steering shaft 29, bronze being used in order to prevent its withdrawal by means of a powerful magnet. In the exposed end of the bolt a disk of hardened steel 28 is inlaid for the purpose of preventing a thief from drilling into the bolt for the insertion of a tool for withdrawing the bolt.

A notch 30 is cut into a side of the bolt for the reception of the cam 24, shown in Figs. 9 and 12. This cam is fastened to the end of the member 31, which is revolved by the key 16 within the cylinder 6. This cam is substituted for the washer which forms a part of a well known pin lock which I buy on the open market, and which is shown in Fig. 12 thus changed. This notch 30 is elongated, as shown in Fig. 3, so that a proper turn of the cam 24 will withdraw the bolt from its locking engagement, but after being thus withdrawn, the key and cam can be turned back to their locking position without affecting the bolt. The purpose of this is to enable the bolt to be pressed into its locking engagement without stopping for the key, by a simple push against the protruding end of the bolt.

When the bolt is in its locking position, its outer end lies a trifle within the surface of the boss 32 to prevent its being seized by nippers and withdrawn. To retain it in its two extreme positions, it is formed with two depressions 33 adapted to be engaged by a ball 34 pressed therein by a helical spring 35, as shown in Figs. 3 and 11.

In applying this lock to a steering wheel, all the parts are first removed from within the cavity 5 in order to permit access to the screws 13. A hole being drilled in the post 26 of a size to receive the boss 25, and a hole 27 made in the steering shaft 29 to receive the end of the bolt 19, the body 1 and its arms 2 and 3 are clamped about the post, with the boss 25 in the hole provided therefor, the clamping being performed by the screws 13.

The disk 21 is then put in place, followed by the spring 35 and ball 34; then the bolt 19 is thrust through the body 1, and the crescent 12 introduced behind the shoulder 10. After this, the locking means 6, 7, 9 and 24 and 23 are put in place, with the spindle 17 entering the hole 20 of the disk 21; and the screws 13 are inserted through the holes 15 and 22 into engagement with the ears 14 of the cylinders 6.

The key can now be turned to its locking position, but the bolt will not be affected thereby, the latter being pressed by hand into locking engagement. For unlocking the shaft 29, the key is turned in the opposite direction to throw the bolt to its position illustrated in Figs. 1 and 10, and is then to be at once turned back to its locking position, and the key to be taken from the lock and put in the owner's pocket. This enables him to lock the steering wheel without a moment's delay, when he reaches a stopping place, and he does not have to hunt around in his pockets for the key. He is, therefore, much less liable to omit to lock the machine against thieves when he has to do nothing more than to push the bolt inward, than he would be were he to have to get out the key.

What I claim is:

1. A lock for the steering post of a motor vehicle, comprising a body having a cylindrical cavity therein open at one end, and an arm rigid therewith, an arm hinged to the outer end of the first-named arm and having its free end seated on the body exterior to the bottom of said cavity, a screw adapted to be introduced through said cavity-bottom from within the cavity into engagement with the free end of the hinged arm, a lock adapted to be fastened within said cavity and thereby to close all access to said screw, and a bolt controlled by said lock.

2. A lock comprising a body having a cavity open at one end and having spaced holes through its bottom, a slidable bolt, a locking means removably inclosed in said cavity, a shielding disk turning with said locking means and having holes corresponding with those through the bottom of said cavity, whereby when the locking means is unlocked, the holes through said disk will be in alinement with those through the bottom, but when locked, said holes will be out of line, and screws adapted to fasten said locking means in said cavity, the parts being disposed to permit said screws to be manipulated by a screw driver inserted through said spaced holes when the locking means is unlocked.

3. A lock comprising a body having a cavity open at one end and having two oppositely disposed holes through its closed end, the cavity having a shoulder and a laterally enlarged space at one side behind the shoulder, a crescent adapted to be put into engagement with said shoulder by means of said space, a locking means, two screws adapted to engage both the crescent and the locking means in alinement with said holes, and a disk adapted to turn with said locking means, and formed with two holes in alinement with the first named holes when the locking means is unlocked.

4. A lock comprising a body having a cavity open at one end and formed with a shoulder near its closed end, the bottom of the cavity having two holes through it, a pin lock having a square spindle adapted to be turned by a key inserted in the lock, a member adapted to be engaged with said shoulder and to avoid said spindle, a disk resting against said bottom and entered by said spindle and turning therewith, means holding said disk snugly against said bottom, and a bolt adapted to be thrown simultaneously with the rotation of said spindle, said disk having openings corresponding to said holes when the bolt is unlocked.

In testimony that I claim the foregoing invention, I have hereunto set my hand this 17th day of May, 1917.

FRANK W. MAILLOUX.